(12) United States Patent
Dell'Oro et al.

(10) Patent No.: US 6,452,949 B1
(45) Date of Patent: Sep. 17, 2002

(54) APPARATUS AND METHOD FOR PROCESSING MULTI-CHANNEL FRAMES OF SYNCHRONOUS DIGITAL SIGNALS

(75) Inventors: Annalisa Dell'Oro, Vimercate; Andrea Veggetti, Maurizio Al Lambro, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/105,752

(22) Filed: Jun. 26, 1998

(30) Foreign Application Priority Data

Jun. 27, 1997 (EP) .............................. 97830310

(51) Int. Cl.[7] ................................. H04J 3/06
(52) U.S. Cl. .................. 370/509; 370/535; 370/537
(58) Field of Search ................ 370/430, 463, 370/470, 473, 474, 476, 478, 480, 484, 503, 506, 507, 509–512, 522, 535–537, 465, 466, 907, 542, 539, 541

(56) References Cited

U.S. PATENT DOCUMENTS

| | | | | |
|---|---|---|---|---|
| 4,967,405 A | * | 10/1990 | Upp et al. .................. 359/135 |
| 5,040,170 A | * | 8/1991 | Upp et al. .................. 359/135 |
| 5,257,261 A | | 10/1993 | Parruck et al. ............... 370/84 |
| 5,416,772 A | * | 5/1995 | Helton et al. ............... 370/376 |

FOREIGN PATENT DOCUMENTS

| | | |
|---|---|---|
| WO | 93/25030 | 12/1993 |
| WO | 96/33563 | 10/1996 |

OTHER PUBLICATIONS

Hamlin R.W., et al. "A SONET/SDH Overhead Terminator for STS–3, STS–3C, and STM–1" *IEEE Journal of Solid –State Circuits*, vol. 28, No. 3, Mar., 1993 pp. 276–281.

* cited by examiner

*Primary Examiner*—Melvin Marcelo
*Assistant Examiner*—Inder Pal Mehra
(74) *Attorney, Agent, or Firm*—Lisa K. Jorgenson; Brian L. Johnson; Seed IP Law Group, PLLC

(57) ABSTRACT

The invention relates to a circuit architecture for processing multi-channel frames of broadband synchronous digital signals, in particular signals of the SONET/SDH standard. The circuit includes an input portion and an output portion. It also contains at least one modular component adapted to process frames comprising a single channel and connectable modularly to N further identical components corresponding to the number of frame channels.

21 Claims, 4 Drawing Sheets

APPARATUS AND METHOD FOR PROCESSING MULTI-CHANNEL FRAMES OF SYNCHRONOUS DIGITAL SIGNALS

TECHNICAL FIELD

This invention relates to a circuit architecture for processing multi-channell frames of broadband synchronous digital signals, in particular signals of the SONET/SDH standard, being of a type which comprises a receiving input portion and a transmitting output portion.

BACKGROUND OF THE INVENTION

It is a universally recognized fact that the foreseeable future of planetary communications rests on broadband video signals.

Accordingly, an expanded application of such facilities as video telephone, video conferencing, video surveillance, color facsimile transmission, and cable television (CATV), calls for integrated circuit architectures which can handle broadband electric signals.

Moreover, the ever more widespread availability of communication and interconnection lines based on fiber optics demands integrated electronic circuits of suitable design and construction to handle broadband signals in an effective and efficient manner.

In this particular field transmission standards have been established, such as the standards known by the acronyms SONET (Synchronous Optical Network) or SDH (Synchronous Digital Hierarchy). These standards are set and controlled by CCITT, a US committee regulating synchronous transmissions based on optical communication.

These standards are useful to settle and organize the transmission protocols that enable information to be transmitted on communications networks, which are complex systems that interconnect communication components.

In particular, the standards considered in this specification expressly relate to the synchronous digital transmission and reception of digital signal frames. An exhaustive review of these problems is found in a text, Broadband Telecommunication Technology, Artech House, 1993, Chapter 3: "Synchronous Digital Transmission".

To better appreciate the aspects of the present invention, notice should be taken of that state-of-art frame processing involves:

A) On reception (RX):
  1) signal pre-processing;
  2) optional demultiplexing, i.e., a frame decomposition for extracting certain subchannels;
  3) parallel processing of the individual channels forming the frame, but in such a way as to have each channel processed separately from the others;
B) On transmission (TX):
  1) preparing in parallel the individual channels forming the frame;
  2) multiplexing the various channels, if more than one are provided;
  3) final processing of the whole frame.

Illustrated in block diagram form by the accompanying FIG. 1A is the structure of a conventional circuit architecture for processing a frame comprising a single channel. In this particular case, the multiplexing or demultiplexing steps obviously would not be required.

On the other hand, FIG. 1B shows, again in block diagram form, the structure of a conventional circuit architecture for processing a frame comprising N channels, with N=3 or N=4.

A further prior solution to the problem of processing multi-channel frames was made available to the general public in 1993 by TransSwitch Corporation, Shelton Conn., U.S.A., and described in a bulletin No. TXC-02201-MC, January 1993. FIG. 2 shows schematically a circuit architecture which operates in accordance with TransSwitch's solution. Similar solution have been proposed by the Spanish Telephonic Company and by the company PCM Serra.

All these examples of applications currently available on the telecommunications market use N+1 components, that is, one component more than the number of channels in the frame.

All of the known solutions provide for the use of a single component to perform the pre-processing and demultiplexing functions on reception, as well as the multiplexing and final processing functions on transmission. In addition, they provide N components, identical with one another, to perform the function of processing in parallel the individual channels on reception, and preparing the individual independent channels on transmission.

Usually, the single component is a definitely smaller size than each of the N components. Its dimensions are smaller by a factor of one to five.

SUMMARY OF THE INVENTION

An embodiment of this invention provides a circuit architecture for processing broadband digital signal frames, particularly intended for the SONET/SDH standards, and for optionally decomposing them into subchannels. This architecture has such structural and functional characteristics as to ensure a substantial reduction in the number and dimensions of the circuit components employed, while also reducing costs and facilitating manufacture.

An embodiment of this invention provides a single component adapted to process single-channel frames, yet usable in a modular manner for a number N of times to process frames comprising N channels.

In one embodiment, the invention includes an input portion, an output portion, and a modular section adapted to process single channel frames. In another embodiment, N modular sections are coupled together and are able to decode frames containing N channels.

The features and advantages of the architecture according to this invention will be apparent from the following description of an embodiment thereof, given by way of non-limitative example with reference to the accompanying drawings.

DETAILED DESCRIPTION OF THE INVENTION

Figure 1A:
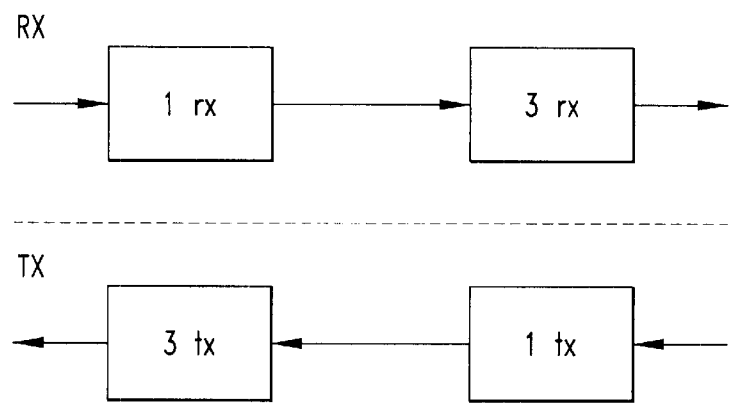
FIGS. 1A and 1B are respective schematic representations of circuit architectures according to the prior art.
Figure 1B:
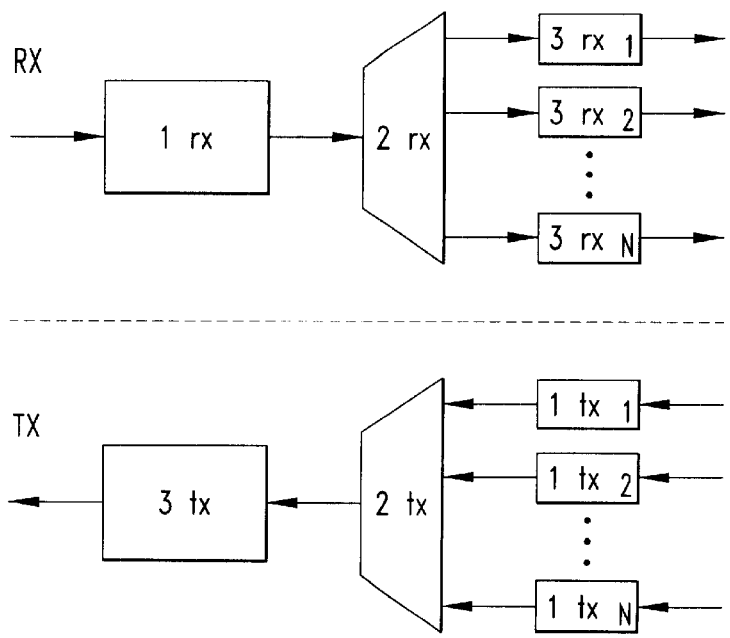
Figure 2:
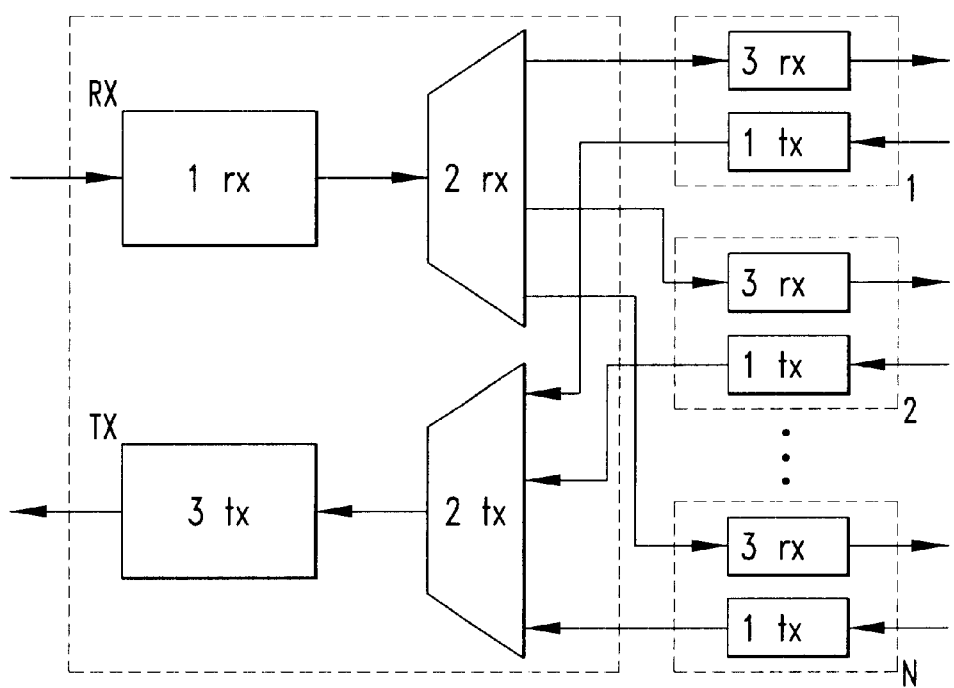
FIG. 2 is a further schematic representation of a prior art circuit solution.
Figure 3:
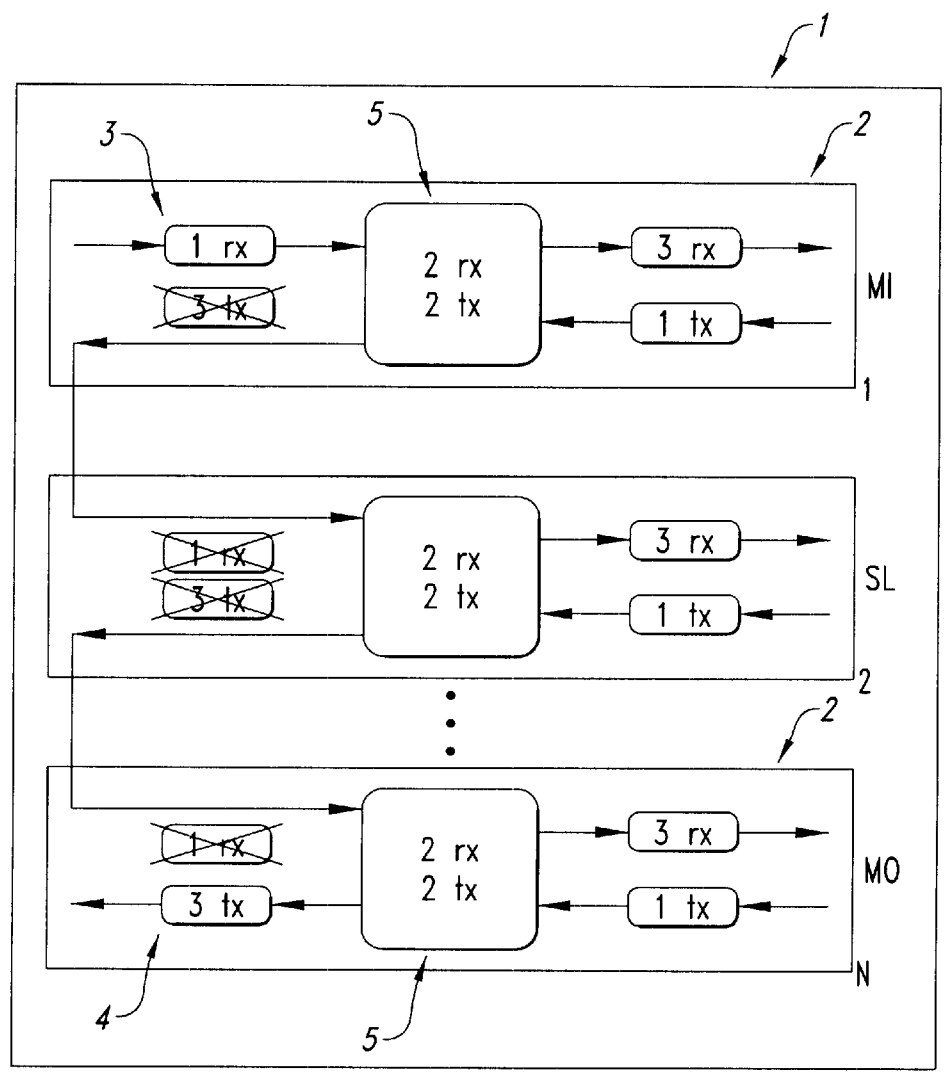
FIG. 3 is a schematic representation of a circuit architecture embodying this invention.

Referring to the drawings, and in particular to FIG. 3 thereof, generally and schematically shown at 1 is a circuit architecture according to the invention for processing broadband synchronous signal frames, specifically to the SONET/SDH standard. This architecture is also effective to decompose such frames into submultiple containers of a lower order.

In essence, the system proposed herein is able to process both SONET/SDH frames comprising a single channel and frames comprising plural subchannels multiplexed together.

Advantageously, the architecture 1 can be implemented in the form of a single electronic circuit integrated in a semiconductor. The architecture 1 comprises a plurality N of identical components 2, each for processing a frame comprising a single channel.

The digital signal frames commonly employed by current standards may be of the following types:

(A) 9 rows by 90 columns;

(B) 9 rows by 270 columns;

(C) three 9×90 frames multiplexed together to form a multi-frame of 9 rows by 270 columns; and (D) four 9×270 frames multiplexed together to form a multi-frame of 9 rows by 1080 columns.

The components 2 can be connected in parallel together, as explained hereinafter. Each component 2 comprises an input portion 3, an output portion 4, and an internal block 5 serving both receive and transmit functions.

The block 5 will also be referred to by the label MUX-DEMUX hereinafter, to indicate the multiplexing and demultiplexing capabilities of this block 5, although the functions it performs are somewhat more complex than mere multiplexing and demultiplexing.

The MUX-DEMUX block 5 represents a coordinator for the receive and transmit portions, generating clock and synchronization signals for such portions. Specifically, the internal block 5 sends appropriate data to each portion.

The architecture of this invention can process frames of different sizes, wherein the larger size frames may comprise exact multiples of the smaller size frames.

In order to make the invention easier to understand, reference will be made hereinafter to a practical instance of a frame which comprises only three channels, without restricting by this choice the protection scope of this Application.

Each component 2 comprises a first input block 1rx carrying out a frame synchronization operation. In particular, the block 1rx will recognize synchronization patterns, and regardless of the frame size and formation, carry out a descrambling operation and a byte-to-byte parity calculation.

The outgoing data from the block 1rx will, therefore, be different from the incoming data, in that they have been scrambled by a polynomial defined by the transmission standard. These data are output together with the synchronization signal identified.

The block 1rx has an output connected to a second block provided in the component 2 of the architecture 1, being referenced 2rx–2tx. This block corresponds essentially to the internal block 5. When a multi-frame is being received, the block 2rx–2tx is operative to extract one byte every three, with C-type frames, or one byte every four, with D-type frames. This extraction takes place after synchronizing and descrambling the frame in the block 1rx.

A third block 3rx is connected downstream of the block 2rx–2tx and comprises counters that, based on the synchronization signal obtained from the first block 1rx, keep track of position within the frame, that is of the row and column. The third block 3rx also allows thorough processing of the frame by coordinating all the operations for extracting and processing the bytes to be handled.

It should be noted that, with frames of the (C) or (D) type, the block 2rx–2tx passes to the block 3rx a clock signal which is by one third or one fourth slower than the original frame synchronization signal. When transmitting, the second block 2rx–2tx replaces the byte which has been extracted and passed to the third block 3rx with that generated by the first block 1tx.

The blocks 1rx and 3rx substantially correspond to the input portion.

The component 2 comprises further blocks on which the transmit step depends. Each component comprises a fourth block 1tx whose output is connected to the second block 2rx–2tx. The fourth block composes the frame by calculating the bytes to be inserted, and placing them into appropriate rows and columns. Subblocks are provided within the block 1tx for calculating the various bytes to be inserted in the various positions within the frame. The block 1tx also comprises counters that keep track of position, that is, of the row and column, within a given frame. The counters also coordinate the frame composition by controlling the acquisition of the byte generated by an appropriate subblock according to the current position.

A fifth block 3tx completes the frame composition by calculating and inserting the parity calculated for all the bytes of the previous frame and already composed at the output. The block 3tx inserts the frame synchronization bytes and scrambles the data to avoid lengthy repetitions of zero and one values.

The fourth and fifth blocks, 1tx and 3tx, substantially correspond to the output portion.

For non-decomposable single frames of the (A) or (B) type, the operations performed by the blocks 1rx and 3rx are executed sequentially with direct connection of such blocks and direct passage of the signals, including the basic synchronization signal. In this case, the operations performed by the blocks 1tx and 3tx are also executed sequentially- and the synchronization signal operates at the same frequency for all four of these blocks 1rx, 3rx, 1tx, 3tx. In other words, frames of the (A) or (B) type do not require operation of the second central block 2rx–2tx.

Provided within the component 2 is a further microprocessor interface block (not shown in FIG. 3) that contains program dedicated registers for defining the operation of the entire component 2. In essence, by suitably programming these registers, the component 2 can be set for operation with frames of the (A) or (B) type and, accordingly, to program the second block 2rx–2tx for utilization of the same clock being input to all the blocks.

Alternatively, the component 2 could be programmed for operation with frames of the (C) or (D) type.

Where the frames are composed of a single channel, MUX-DEMUX must be able to pass the data stream, and corresponding control signals, in a transparent way from the block 1rx to the block 3rx, and in an independent manner from the block 1tx to the block 3tx.

Where the frames are instead to be decomposed into subchannels, there are two decompositions possible:

a) mapping three frames of 51 Mbit/s into one frame of 155 Mbit/s;

b) mapping four frames of 155 Mbit/s into one frame of 622 Mbit/s.

The component 2 employed in such cases would be the same, but programmed in different ways, namely:

MI (Master Input), SL (Slave), and MO (Master Output). Particularly in case b, there would be two slaves SL1 and SL2 processing two different subchannels in the same way.

References MI, SL, MO are attached in FIG. 3 to each of the components 2 shown to indicate their functions in this specific example. Furthermore, the disabled blocks are crossed out.

Each of the components 2 processes one channel, except that the channel referenced MI will also effect an initial pre-processing 3 (1rx) of the complex frame entering reception, while the channel referenced MO will effect the final processing 4 (3tx) of the exiting complex frame.

The block MUX-DEMUX 5 will operate differently, depending on how it is programmed. The first case a) will be considered first to explain how a frame can be decomposed into three subchannels. The frame includes three smaller frames, alternating a byte from each of the three subframes.

Figure 4:
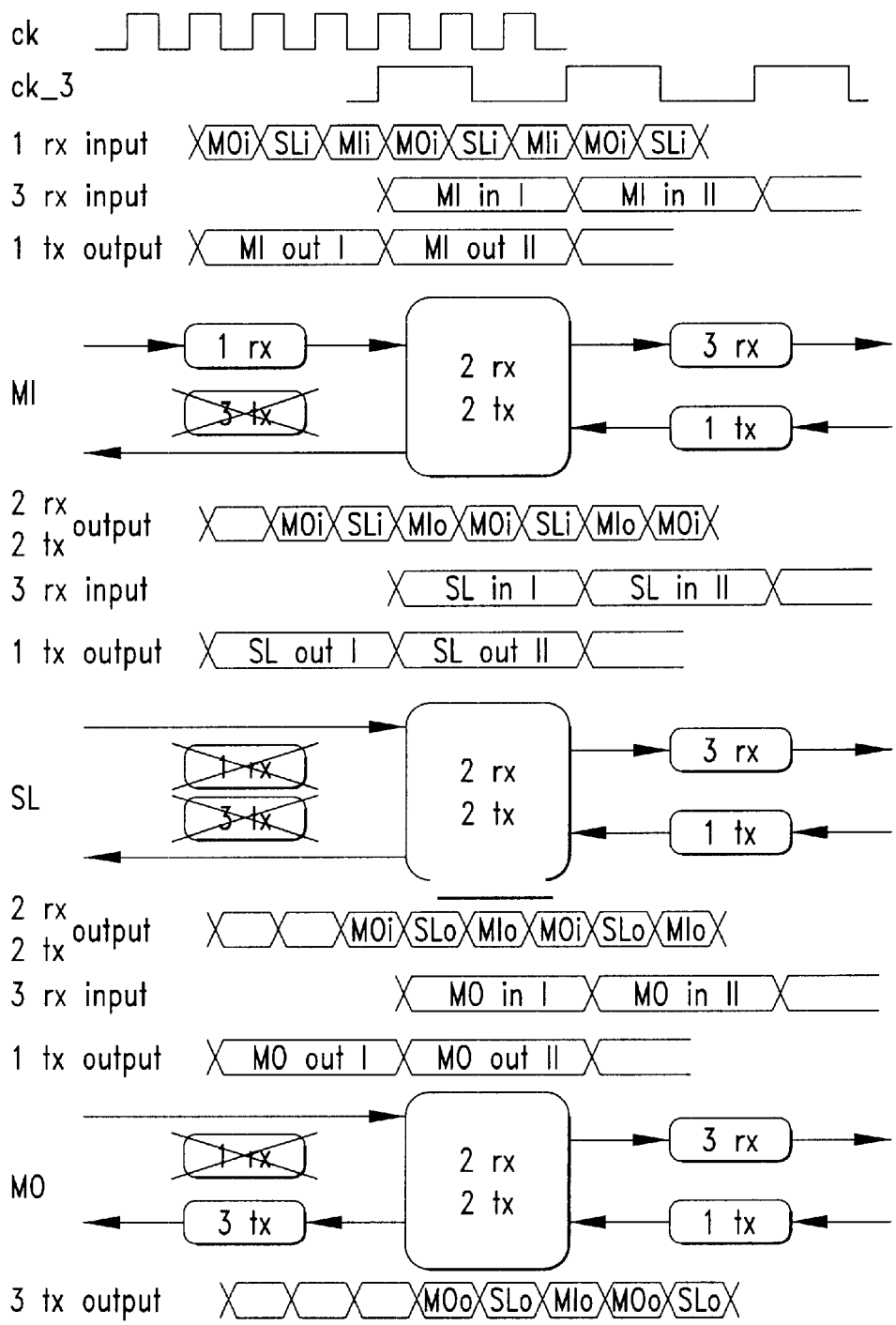
FIG. 4 shows schematically and with timing diagrams a few sequences of digital signals appearing at the inputs and outputs of the various components of the inventive architecture, in an exemplary application involving a three-channel frame.

Thus, the block MUX-DEMUX 5 of the first component MI first enables the block 1rx to act on the most complex incoming frame, as shown in FIG. 4. Then, from the block 1rx output, one byte every three is extracted, starting from the third, and passed to the third block 3rx with latched related synchronization signals and, of course, a clock signal at the rate of one third the starting rate. This clock is generated and synchronized by the same MUX-DEMUX 5.

As for the remaining channels to be extracted and processed sequentially from the next components, the same MUX-DEMUX 5 outputs the two channels received from the block 1rx and not forwarded to the remaining local receive block, as well as the channel composed of the local block 1tx that constitutes one of the three channels composing the definitive complex frame.

The manner of passing this information on to the following components consists of replacing the channel extracted for local reception with that built by the local transmission. This operation is effected by forwarding the synchronization obtained from the block 1rx and keeping the blocks 3rx and 1tx synchronized by the same clock signal. This is done at a rate of one third the clock used by all MUX-DEMUXs 5 of the various components, and by the 1rx of MI and 3tx of MO only.

The same synchronization is also passed to the following components. In addition, the MUX-DEMUX 5 of MI disables the local block 3tx, since the final processing of the complete frame can only be effected after the latter has been built, alternating one byte every three, out of the frames from the three blocks 1tx of the various components.

The block MUX_DEMUX 5 of the component referenced SL disables both the local block 1rx and the local block 3tx, since it only extracts and processes the second channel (one byte every three from the second) and replaces it with the channel generated by the block 1tx.

The block MUX_DEMUX 5 of the component 2 referenced MO disables its own block 1rx and extracts one byte every three from the first, replacing it with that from 1tx, and forwards the frame thus built to the block 3tx for final processing. The result supplied from this block 3tx represents the final output from the architecture 1.

FIG. 4 may aid to appreciate the operation of the architecture of this invention. This Figure shows the sequences of input and output signals to/from the various components 2 of the architecture 1, as programmed for processing three channels.

Likewise, in the second case b) relating to the mapping of four channels in a frame of 622 Mbit/s, the MUX-DEMUX of the master component referenced MI will behave similarly to that previously described, except that the extracted channel will be of one every four from the fourth. The second component, acting as a slave SL1, will extract one byte every four from the third, while the third component SL2 will extract one byte every four from the second, and the last Master Output (MO) component extract one byte every four from the first.

The invention solves technical problems of the prior art and offers several advantages. Foremost among the advantages is that, in connection with electronic boards for 622 Mbit/s applications, there are four components provided, instead of five as in the prior art, plus a microprocessor and a component serving PMD (Physical Media Dependent) functions. Thus, using the invention, fewer components are necessary to perform the same function than with the prior art. In particular, the spared component in this approach would have had to handle a large number of highspeed interconnections.

By contrast, for either 51. 155 or 622 Mbit/s single channel applications, only one component is used instead of two in the prior art. For a practical implementation of this architecture, it is obviously more convenient to develop one, albeit slightly more complex, component than two separate components.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A circuit architecture for processing multi-channel frames of broadband synchronous digital signals, in particular signals of the SONET/SDH standard, comprising:
at least one modular component having a receiving input portion and a transmitting output portion, the modular component being adapted to process frames comprising a single channel and modularly connectable to N further identical modular components corresponding to the number of frame channels in the frames, each of the modular components having one or more program dedicated registers to define operation of the modular component.

2. The architecture according to claim 1 wherein at least a first one of the modular components comprises an input first block forming a part of said input portion and being structured to perform a frame synchronization operation.

3. The architecture according to claim 2 wherein each modular component comprises an internal second block connected to the receiving input and transmitting output portions of the component, and acting thereon as a coordinator.

4. The architecture according to claim 3 wherein each component comprises a third block connected downstream of the second block and provided with counters which, based on a synchronization signal obtained from the first block, can keep track of position within a frame and allow complete frame processing by coordinating all extracting and processing operations for bytes to be handled.

5. The architecture according to claim 4 wherein, with multi-channel frames, the second block supplies, to the third block, a synchronization signal which is by one third or one quarter slower than the frame synchronization signal obtained in the first block.

6. The architecture according to claim 4 wherein, on transmission, the second block replaces an extracted byte passed to the third block with a byte generated by the first block.

7. The architecture according to claim 4 wherein each modular component further comprises a fourth block having an output connected to the second block, and being adapted to compose the frame by calculating the bytes to be inserted and placing them on rows and columns.

8. The architecture according to claim 7 wherein at least one component comprises a further block which completes a frame composition by calculating and inserting a parity for all bytes of the frame.

9. The architecture according to claim 1 wherein, for multi-channel frames, a first modular component acts as a master input, at least a second modular component acts as a slave, and at least one final modular component acts as a master output.

10. The architecture according to claim 9 wherein said first modular component carries out an initial pre-processing of a complex frame entering reception, while said final modular component carries out a processing of an outgoing complex frame.

11. A circuit for processing broadband synchronous digital signals comprising:
   a module having an input section for receiving a broadband signal;
   the module being an output section for outputting a processed signal; and
   the module including components adapted to process single channel frames decoded from the broadcast signal into the processed signal, and wherein the module is structured to disable the input section or the output section or both the input and output sections when the module is coupled to other identical modules.

12. The circuit of claim 11, further comprising:
   N-1 additional modules each coupled to the module, wherein the circuit is structured to process N channel frames decoded from the broadcast signal.

13. The circuit of claim 12 wherein at least one of the modules includes:
   a defeatable first input section for performing frame synchronization,
   a second input section for tracking position of data within a given frame,
   a first output section for composing a frame, and
   a defeatable second output section for synchronizing the frame composed by the first output section.

14. The circuit of claim 13 wherein the modules are identified as first, middle, or last.

15. The circuit of claim 14 wherein the second output section of the first module is disabled.

16. The circuit of claim 14 wherein the first input and second output section of all of the middle modules are disconnected.

17. The circuit of claim 14 wherein the first input section of the last module is disconnected.

18. A method of processing broadband synchronous digital signals including N channels per frame, the method comprising the steps of:
   accepting a broadband signal at an input;
   decoding the signal into N channels per frame;
   extracting a first byte from the frame at a first module having one or more program dedicated registers to define operation of the first module;
   passing the extracted byte plus remaining bytes in the frame to a next module having one or more program dedicated registers to define operation of the next module;
   repeatedly extracting one byte per module and passing the extracted bytes plus the remaining bytes to a subsequent module, also having one or more program dedicated registers to define operation of the subsequent module, until N bytes are extracted;
   processing the extracted bytes into a processed signal; and
   outputting the processed signal.

19. A method of processing broadband synchronous digital signals including N channels per frame, the method comprising the steps of:
   accepting a broadband signal at an input;
   decoding the signal into N channels per frame;
   extracting a first byte from the frame at a first module;
   passing the extracted byte plus remaining bytes in the frame to a next module;
   repeatedly extracting one byte per module and passing the extracted bytes plus the remaining bytes to a next module until N bytes are extracted;
   processing the extracted bytes into a processed signal; and
   outputting the processed signal wherein a portion of all of the modules operate at a frequency at 1/N times an original frame rate signal.

20. A method of processing broadband synchronous digital signals including N channels per frame, the method comprising the steps of:
   accepting a broadband signal at an input;
   decoding the signal into N channels per frame;
   extracting a first byte from the frame at a first module;
   passing the extracted byte plus remaining bytes in the frame to a next module;
   repeatedly extracting one byte per module and passing the extracted bytes plus the remaining bytes to a next module until N bytes are extracted;
   processing the extracted bytes into a processed signal; and
   outputting the processed signal wherein the step of outputting the processed signal comprises inserting a frame synchronization signal into the processed signal.

21. A circuit architecture for processing multi-channel frames of broadband synchronous digital signals, in particular signals of the SONET/SDH standard, comprising:
   at least one modular component having a receiving input portion and a transmitting output portion, the modular component being adapted to process frames comprising a single channel and modularly connectable to N further identical modular components corresponding to the number of frame channels in the frames, wherein at least a first one of the modular components comprises an input first block forming a part of said input portion and being structured to perform a frame synchronization -operation, wherein each modular component comprises an internal second block connected to the receiving input and transmitting output portions of the component, and acting thereon as a coordinator, wherein each component comprises a third block connected downstream of the second block and provided with counters which, based on a synchronization signal obtained from the first block, can keep track of position within a frame and allow complete frame processing by coordinating all extracting and processing operations for bytes to be handled, and wherein, with multi-channel frames, the second block supplies, to the third block, a synchronization signal which is by one third or one quarter slower than the frame synchronization signal obtained in the first block.

\* \* \* \* \*